(12) United States Patent
Oliva et al.

(10) Patent No.: US 8,155,010 B1
(45) Date of Patent: *Apr. 10, 2012

(54) REGIONAL QUALITY CORRELATION FOR WIRELESS COMMUNICATIONS

(75) Inventors: Stephen A. Oliva, Leawood, KS (US); Kevin Harry Hansen, Shawnee, KS (US); Anthony C. Wells, Overland Park, KS (US)

(73) Assignee: Sprint Communications Company L.P., Overland Park, PA (US)

( * ) Notice: Subject to any disclaimer, the term of this patent is extended or adjusted under 35 U.S.C. 154(b) by 1903 days.

This patent is subject to a terminal disclaimer.

(21) Appl. No.: 11/156,411

(22) Filed: Jun. 20, 2005

(51) Int. Cl.
*H04L 1/00* (2006.01)
(52) U.S. Cl. .................. 370/241; 370/328; 370/338
(58) Field of Classification Search ............. 370/241, 370/242–254, 328–339
See application file for complete search history.

(56) References Cited

U.S. PATENT DOCUMENTS

| | | | |
|---|---|---|---|
| 7,463,634 B1 * | 12/2008 | Hansen | 370/395.2 |
| 7,596,373 B2 * | 9/2009 | McGregor et al. | 455/425 |
| 2006/0246901 A1 * | 11/2006 | Sivakumar et al. | 455/436 |

* cited by examiner

*Primary Examiner* — Frank Duong (57) ABSTRACT

A quality processing system comprises an interface and a processing system. The interface is configured to receive a first quality message from a wireless end device in the first region wherein the first quality message indicates a first quality metric of the first region during the session, and receive a session quality message indicating a session quality metric for the session. The processing system is configured to process the first quality metric with the session quality metric to determine if the session problem occurred in the first region or the second region, generate an isolation message indicating in which of the first region or second region the problem occurred, and transfer the isolation message.

19 Claims, 8 Drawing Sheets

Table 710

| SESSION ID | DEVICE 1 | DEVICE 2 | Access Point | Entity | Session Quality | Link Quality |
|---|---|---|---|---|---|---|
| A | 301 | 324 | 312 | Customer A | high | high |
| B | 302 | 324 | 312 | Customer C | low | low |
| C | 303 | 334 | 312 | Customer B | high | high |
| D | 303 | 335 | 313 | Customer B | low | high |

Table 720

| SESSION ID | DEVICE 1 | DEVICE 2 | Access Point | Entity | Session Quality | Link Quality |
|---|---|---|---|---|---|---|
| A | 301 | 324 | 312 | Customer A | low | low |
| B | 302 | 335 | 312 | Customer C | low | low |
| C | 303 | 335 | 313 | Customer B | high | high |

REGIONAL QUALITY CORRELATION FOR WIRELESS COMMUNICATIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to quality of service systems, methods, and software for wireless communications.

2. Description of the Prior Art

Current wireless packet based communication systems provide services on a best effort basis. Some services that are provided over wireless systems include standard data services, such as file transfer, e-mail, and Internet browsing. For example, end users typically gain Internet access using access devices that interface with wireless base stations. Factors that affect the quality of service provided over wireless networks include the number of end users accessing any particular base station, the quality of connections between access devices and base stations, and the connection quality between base stations and a backhaul network, as well as other factors.

Unfortunately, current wireless packet based systems do not provide for effective quality of service monitoring, correlation, and evaluation. One prior art solution for monitoring quality of service in wireline networks is the real-time control protocol (RTCP). However, RTCP message exchange is relegated to the end points of a wireline network. End points in wireline networks often times exchange RTCP messages regarding the quality of a session setup between the end points. For example, media terminal adapters (MTA) in cable networks utilize RTCP.

Recently, real-time wireless services have become increasingly popular. Examples of real-time services include wireless voice and video over packet (VoP) services. While traditional data services like e-mail and Internet browsing can be provided effectively on a best effort basis, real-time services require more robust mechanisms to ensure a high quality of service.

SUMMARY OF THE INVENTION

An embodiment of the invention helps solve the above problems and other problems by providing methods, systems, and software for improved quality correlation capabilities. In an embodiment of the invention, a quality processing system provides the ability to correlate quality data from various network regions and elements involved on a service session. The quality processing system provides session problem isolation and correlation capabilities based on the quality of service provided in a first region and a second region of a plurality of regions of a communication network.

In an embodiment of the invention, the quality processing system comprises an interface and a processing system. The interface is configured to receive a first quality message from a wireless end device in the first region wherein the first quality message indicates a first quality metric of the first region during the session, and receive a session quality message indicating a session quality metric for the session. The processing system is configured to process the first quality metric with the session quality metric to determine if the session problem occurred in the first region or the second region, generate an isolation message indicating in which of the first region or second region the problem occurred, and transfer the isolation message.

In an embodiment of the invention, the problem is determined to have occurred in the second region if the session quality metric is of a lower level than the first quality metric.

In an embodiment of the invention, the first quality metric of the first region comprises a rating of a wireless link between the wireless end device and a wireless access point coupling the first region and the second region.

In an embodiment of the invention, the session quality metric indicates a rating of the overall quality of the session between the wireless end device in the first region and a destination in the second region.

In an embodiment of the invention, the rating of the wireless link comprises a rating of the signal strength of the wireless link.

In an embodiment of the invention, the rating of the wireless link comprises a rating of the data rate of the wireless link.

In an embodiment of the invention, the wireless access point comprises a WiFi access point.

In an embodiment of the invention, the wireless access point comprises a WiMax access point.

In an embodiment of the invention, the session comprises a voice over packet session.

In an embodiment of the invention, the session comprises a video over packet session.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
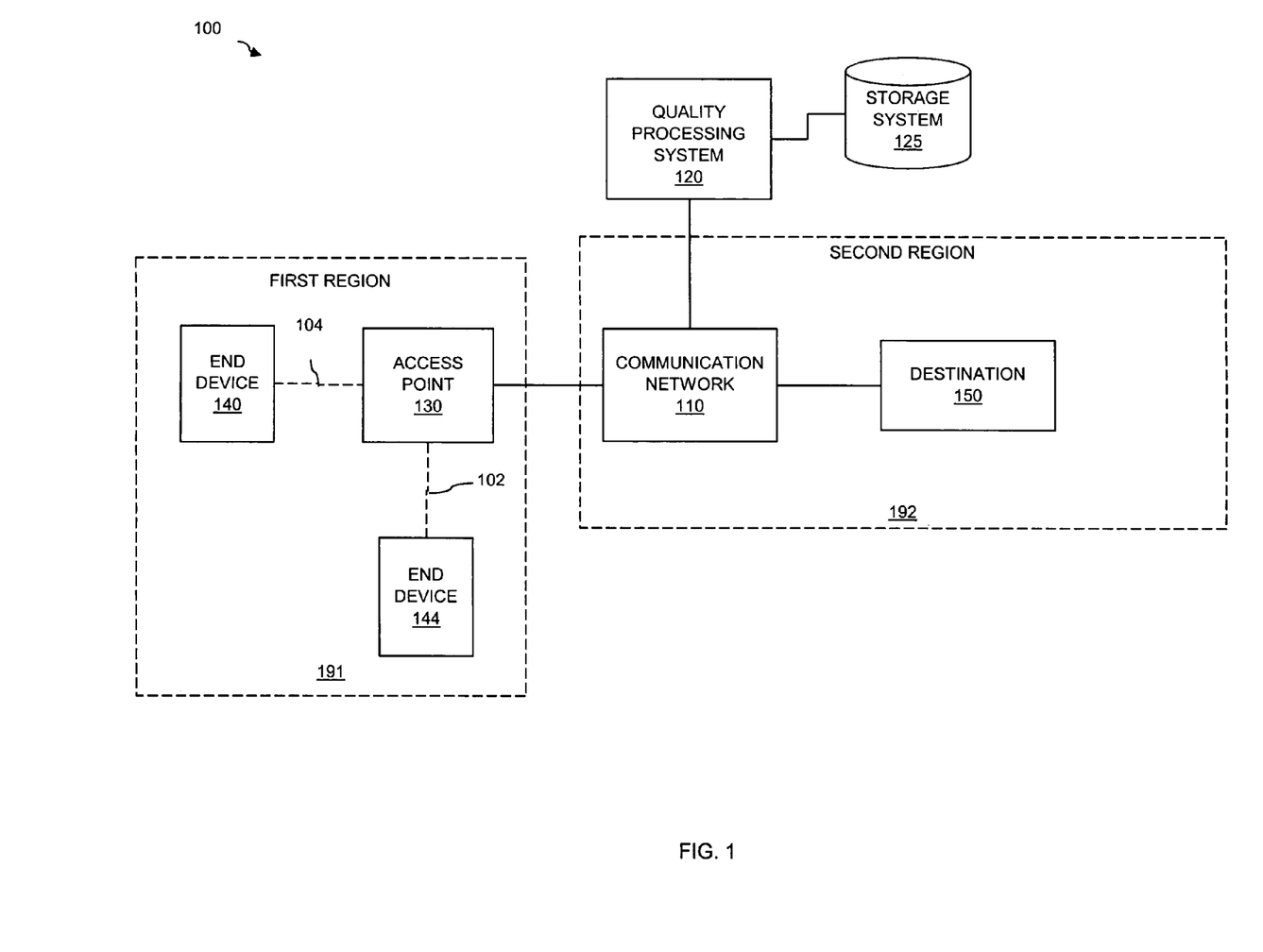
FIG. 1 illustrates a communication system in an embodiment of the invention.
Figure 2:
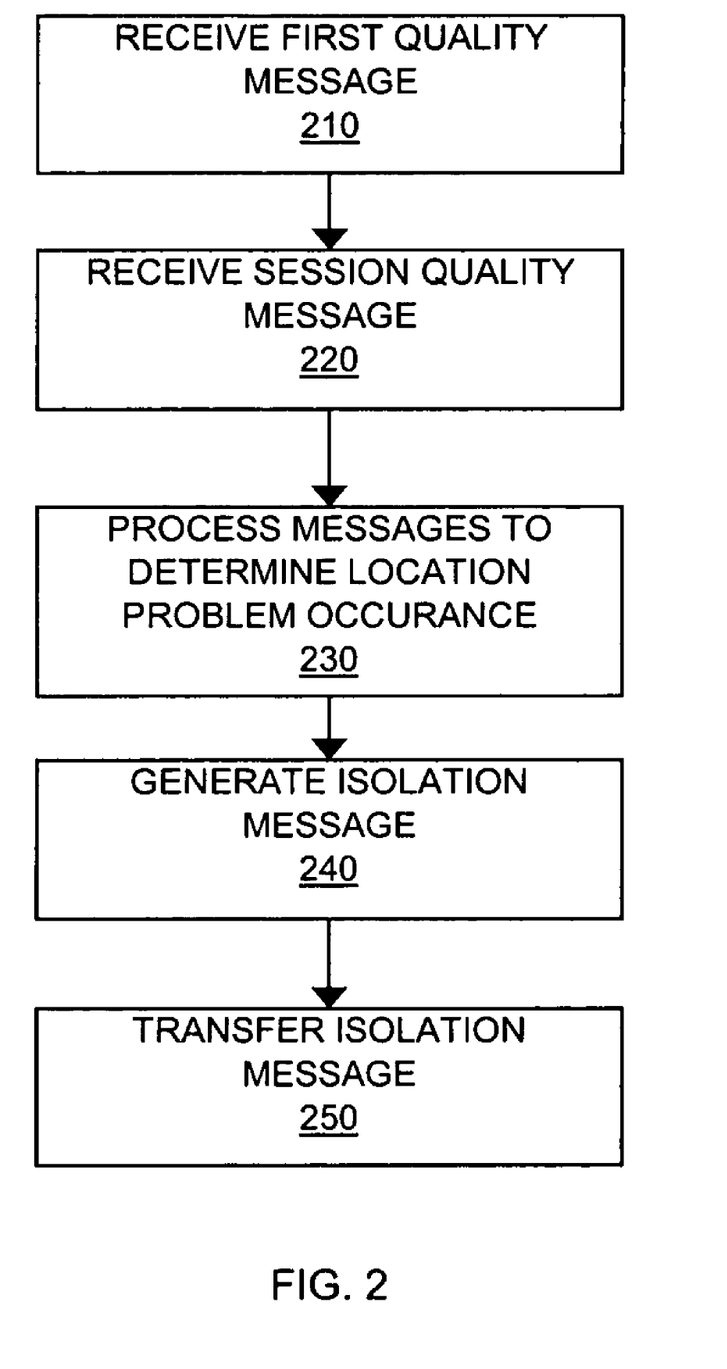
FIG. 2 illustrates the operation of a quality processing system in an embodiment of the invention.

First Embodiment Configuration and Operation—FIGS. 1 and 2

FIG. 1 illustrates communication system 100 in an embodiment of the invention. Communication system 100 includes communication network 110, quality processing system (QPS) 120, database system 125, wireless access point 130, wireless end device 140, and destination 150. QPS 120 is in communication conventionally with access point 130 over network 110. Similarly, destination 150 is also in communication with access point 130 over network 110. End device 140 is in communication with access point 130 over wireless link 104, and end device 144 is in communication with access point 130 over wireless link 102.

Communication system 100 is illustrated as including two regions 191 and 192. First region 191 includes wireless end device 140, access point 130, and wireless end device 144. Second region 192 includes communication network 110 and destination 150. First region 191 could be considered the wireless region or sector of communication system 100, whereas second region 192 could be considered the non-wireless region or sector of communication system 100.

Access point 130 is any network element capable of transmitting and receiving traffic between end devices 140 and 144, and network 110. Access point 130 could be, for example, a wireless base station. Access point 130 is also any network element capable of communicating with end devices 140 and 144 using a wireless protocol, such as WiFi, GSM, CDMA, WiMax or IDEN, as well as other wireless protocols. Similarly, end devices 140 and 144 are any wireless devices capable of communicating with access point 130 using a wireless protocol. End device 140 and 144 could be, for example, wireless phone, wireless computing device, pagers, or wireless multimedia devices, as well as other types of end devices.

Network 110 could be any single or group of network elements capable of carrying communications between access point 130 and destination 150, and quality messages between access point 130 and QPS 120. Communications could be real-time communications or streaming communications, as well as other types of communications. For example, communication network 110 could be an Internet, intranet, local area network (LAN), or circuit switched network, as well as other types of networks and groups of networks. Destination 150 could be any type of destination, such as another wireless end device. However, destination 150 could also represent a destination network, or an edge device at the edge of another network, such as a gateway or border controller, which in turn could also be regionalized.

In this embodiment, access point 130 exchanges traffic with wireless end device 140 for a session between end device 140 and destination 150. Access point 130 handles traffic in the conventional manner understood by those in the art. For instance, access point transmits and receives traffic for a session to and from end device 140. Access point 130 also receives and transmits traffic to network 110 for destination 150. Access point 130 transmits and receives the traffic to and from end device 140 over wireless link 104.

During the session, characteristics of wireless link 104 could vary. For example, the strength of the radio frequency (RF) signal that provides the wireless link 104 between end device 140 and access point 130 could increase or decrease. In addition, the data throughput rate of wireless link 104 could vary. The varying strength of signal could affect the quality of the session. For instance, a weak signal could lead to session interruptions or cessation. Other parameters that could be measured to determine wireless link characteristics include, for example, noise levels, the number of handoffs to alternate receivers or channels, and the level of signaling congestion.

While participating on the session, wireless end device 140 determines a quality metric based on one or more of the characteristics of wireless link 104. For example, the quality metric could indicate a rating of the strength of the RF signal during the session. The rating could be composed of numerical indicators or grades. Alternatively, the rating could be composed of a simple low, medium, or high description.

Upon determining the quality metric, end device 140 generates and transmits a regional quality message indicating the quality metric. The regional quality message also indicates the session related to the quality metric. In an alternative, access point 130 determines the quality metric based on a characteristic of wireless link 104, rather than end device 140. In this case, access point 130 would also generate and transmit a regional quality message indicating the quality metric.

The regional quality message could be an independent message transmitted by end device 140 for QPS 120. Nearly simultaneously, end device 140 and destination 150 exchange session quality messages. An example of a session quality message is an RTCP message. In an example, remote probes monitoring the conventional links within communication network 110 would recognize the session quality message and transfer a copy of the message to QPS 120. If the regional quality message is not sent to QPS 120, the probes could recognize the regional quality message and transmit the messages onward to QPS 120. Alternatively, a message processing system situated strategically between access point 130 and QPS 120 could intercept both the regional quality message and the session quality message. The message processing system would then re-transmit the messages to QPS 120.

FIG. 2 illustrates the operation of quality processing system 120 in an embodiment of the invention. After end device 140 or access point 130 has transmitted a regional quality message, QPS 120 receives the regional quality message (Step 210). QPS 120 also receives the session quality message (Step 220). The regional quality message pertains to the quality of service provided to end device 140 in first region 191. The session quality message pertains to the overall quality of service experienced during the session. Thus, the session quality message pertains to combined service provided by first region 191 and second region 192.

In this embodiment, it is assumed that a problem occurred during the session between end device 140 and destination 150. It is therefore desirable to determine if the problem occurred in first region 191 or second region 192. For instance, if the operator of QPS 120 operates second region 192, but not first region 191, it would be beneficial to determine if the problem occurred in second region 192, as opposed to first region 191. Therefore, and upon receiving both messages, QPS 120 processes the messages to determine whether the problem occurred in the first or second region 191 or 192 (Step 230). After having isolated the problem, QPS 120 generates an isolation message containing information indicating in which of first or second regions 191 and 192 the problem occurred (Step 240). Lastly, QPS 120 transfers the isolation message (Step 250).

In an embodiment, the problem is determined to have occurred in second region 192 if the first quality metric is of a higher level than the session quality metric. For example, the first quality metric could indicate that the signal strength between end device 140 and access point 130 was very strong, and that the overall session quality was low. This would imply that the problem causing the low overall session quality was caused by an event or network element within second region 192.

In an alternative embodiment, QPS 120 receives the regional quality message pertaining to the quality of service provided within a region. QPS 120 determines an entity associated with the session indicated in the quality message. An entity could be, for instance, the end user using end device 140, or a parent organization—such as a corporation or university—associated with end device 140. Alternatively, an entity could be a network element, such as access point 130. The entity could also be a third-party service provider that is associated with the session. QPS 120 derives the entity by accessing and processing a session table that holds session data. Session data describes various characteristics of individual sessions, such as the associated customers, network elements used during the session, the route chosen for the session, and the service provided during the session. QPS 120 stores the quality metric in storage system 125 in association with the determined entity.

After having stored the quality metric in association with the entity, storage system 125 will, in the aggregate, hold information describing the session quality on a session by session basis. In addition, the information will describe various physical aspects of each particular session, such as the quality of a wireless link. In this manner, a network operator can determine the cause of a problem associated with a session. For example, a customer might complain to the network operator that a session was dropped. The operator can access storage system 125 using QPS 120 to view the actual physical characteristics of the session. If the wireless link used for the session was of a high quality, then the operator can deduce that the cause will be found elsewhere in the network. If the wireless link was very weak, then the operator will know that the cause of the dropped session was likely the link used by the customer.

Also in the aggregate, QPS 120 can store and retrieve session quality data related to any number of ongoing or past sessions. As a result, the quality of all the past sessions associated with a particular wireless link can be retrieved and processed to determine if the link historically provides good service. Similarly, the quality history of a particular customer can be retrieved across any number of sessions. For example, the individual wireless quality measurements for all sessions associated with a particular corporate customer could be retrieved and processed to provide a comprehensive overview of the quality of service provided to that customer.

Second Embodiment Configuration and Operation—FIGS. 3-7

Figure 3:
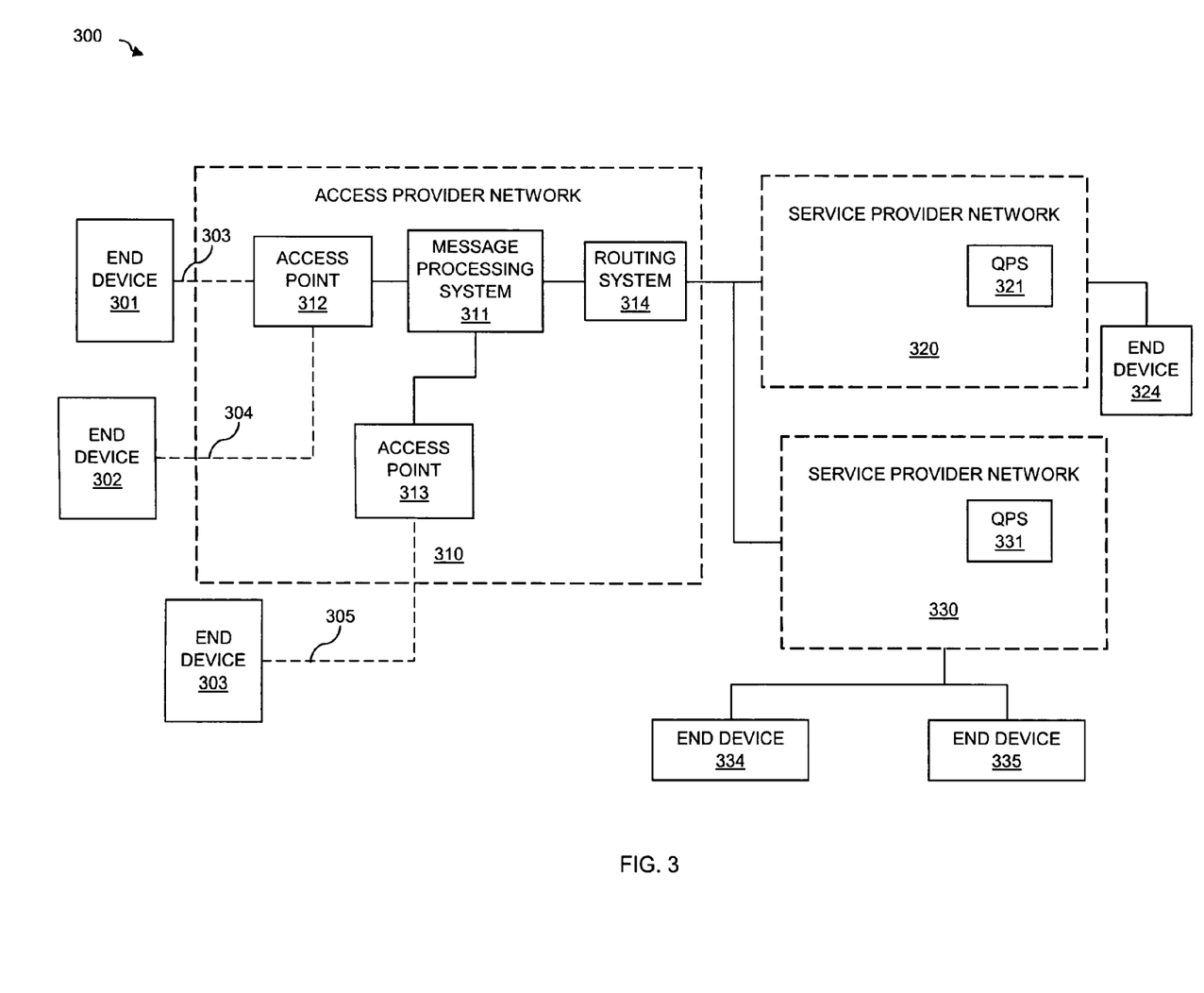
FIG. 3 illustrates a communication network in an embodiment of the invention.

FIG. 3 illustrates communication network 300 in an embodiment of the invention. Communication network 300 includes access provider network 310, service provider network 320, and service provider network 330. Access network 310 could be considered a region distinct from service provider networks 320 and 330. Likewise, service provider networks 320 and 330 could be considered distinct regions.

Access network 310 provides users with access to services provided by service provider networks 320 and 330. For example, access network 310 could be a high-speed cable network. Users utilizing end devices 301, 302, and 303 access services, such as voice, video, and music packet services, through access network 310. While some users may use services provided by service network 320, others may use services from service network 330. An example of a service provider network could be, for example, a telecom carrier, an internet service provider, or a cable provider, as well as other types of service providers. Importantly, access network 310 provides users access to third-party networks, such as service provider networks 320 and 330.

Access network 310 includes wireless access point 312, wireless access point 313, routing system 314, and message processing system 311. Access network 310 could include other elements that are not shown for the purpose of clarity. Routing system 314 is any system capable of routing communications within access network 310 and between access network 310 and other networks, such as service networks 320 and 330. Access point 312 could be a wireless transceiver, such as a WiFi base station. Similarly, access point 313 could be a wireless transceiver, such as a WiFi base station. Other types of wireless transceivers are possible, such as CDMA, GSM or IDEN cellular base stations.

End device 301, 302, and 303 are any devices capable of interfacing with access points 312 and 313. End devices 301, 302, and 303 could be, for example, wireless phones, wireless computers, pagers, wireless personal digital assistants, or wireless multi-media devices, as well as other types of end devices. Wireless link 303 links end device 301 with access point 312. Wireless link 304 links end device 302 with access point 312. Wireless link 305 links end device 303 with access point 313. A wireless link could be, for example, radio frequency (RF) transmissions between the end devices and access points, as well as other types of links.

Service provider network 320 includes quality processing system (QPS 321). Similarly, service provider network 330 includes QPS 331. End device 324 is in communication with service network 320. End device 334 is in communication with service network 330. End devices 324, 334, and 335 could be any type of end device capable of interfacing with service networks 320 and 330, such as phones, computers, servers, pagers, or multi-media devices, as well as other types of devices. Service networks 320 and 330 could include additional elements that have been omitted for the sake of clarity.

Figure 4:
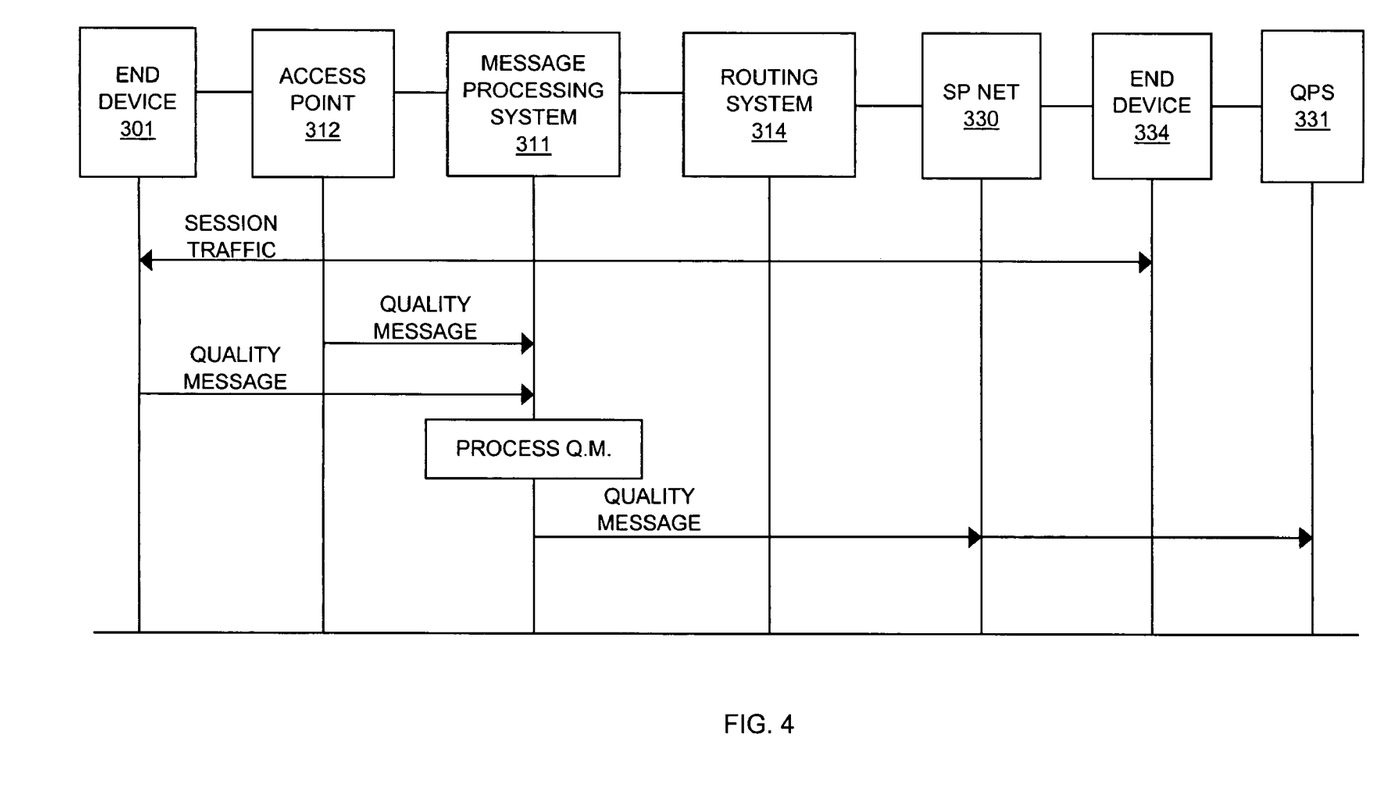
FIG. 4 illustrates the operation of a communication network in an embodiment of the invention.

FIG. 4 is a session flow diagram illustrating the operation of communication network 300 in an embodiment of the invention. In operation, end device 301, 302, and 303 create sessions with other devices. In this embodiment, end device 301 has created a session with end device 334. The session could be, for example, a VoP session. During such a session, end device 301 exchanges session traffic with end device 334. Included in the session traffic are session quality messages, such as RTCP messages. The session traffic is transmitted and received to and from end device 301, access point 312, routing system 314, service provider network 330, and lastly, with end device 334.

In a typical session, traffic intended for end device 334 is indicated by a session ID. Routing system 314 receives the traffic and performs an address translation based on the session ID. Routing system 314 then transmits the traffic to service network 330 indicating the session ID. Service provider network 330 receives the traffic and performs another address translation based on the session ID in order to address the traffic for end device 334. Other various and well known address translation schemes are possible.

At any point during the session, access point 312 determines the quality of wireless link 303. In this case, access point 312 determines the quality of the incoming wireless transmission from end device 301. Access point 312 generates a quality metric that corresponds to one or more of several characteristics of the wireless transmission. For instance, the quality metric could be derived from the strength of the signal transmitted from end device 301. Upon determining the link quality, access point 312 generates a regional quality message indicating the quality of the measured link. Next, access point 312 transmits the regional quality message.

As illustrated by FIG. 4, it should be understood that end device 301 is also capable of determining the quality of wireless link 303. In this case, end device 301 determines the quality of the incoming wireless transmission from access point 312. End device 301 generates a quality metric that corresponds to one or more of several characteristics of the wireless transmission. For instance, the quality metric could be derived from the strength of the signal transmitted from access point 312. Upon determining the link quality, end device 301 generates a regional quality message indicating the quality of the measured link. Next, end device 301 transmits the regional quality message generally concurrently with a session quality message. It should also be understood that end device 301 could operate in this manner concurrently with access point 312, or separately.

Message processing system 311 probes traffic streams for regional and session quality messages transmitted by end device 301 or access point 312. The quality messages could be identified by a modified field type indicator in the packet header scheme. In an alternative, the quality messages could be directly addressed to message processing system 311, rather than requiring message processing system 311 to monitor session traffic for quality messages.

Figure 5:
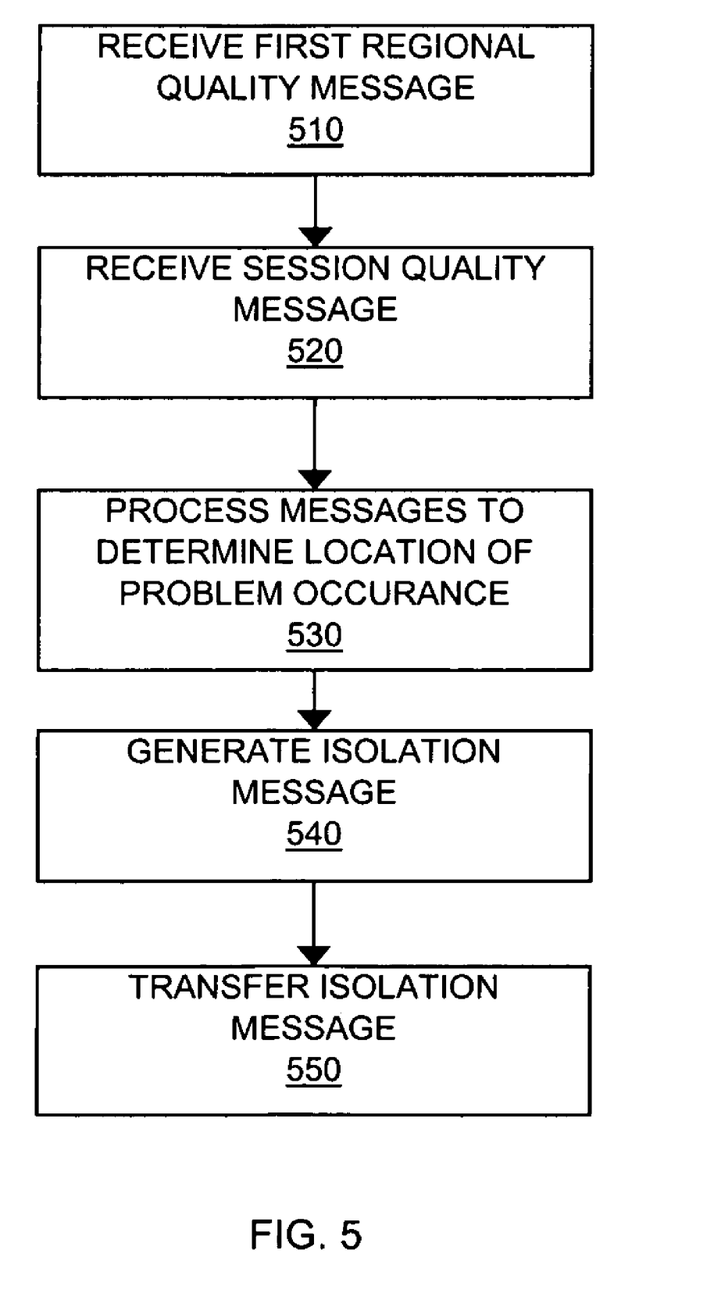
FIG. 5 illustrates the operation of a quality processing system in an embodiment of the invention.

FIG. 5 illustrates the operation of QPS 331 in an embodiment of the invention. QPS 331 ultimately receives both the regional quality message and the session quality message (Steps 510 and 520). In the event of a session problem, the regional and session quality messages can be processed together to determine in which region the problem occurred (Step 530). For example, the problem could be with the wireless link in access provider network 310. Alternatively, the problem could be in service provider network 330. In response to determining the location of the problem, QPS 331 can generate (Step 540) and transfer an isolation message to a graphical user interface for display to a network operator (Step 550). QPS 331 could also transfer the isolation message to an alarm generation system, a text messaging system, or other systems for alerting network operators to the problem and its region.

Figure 6:
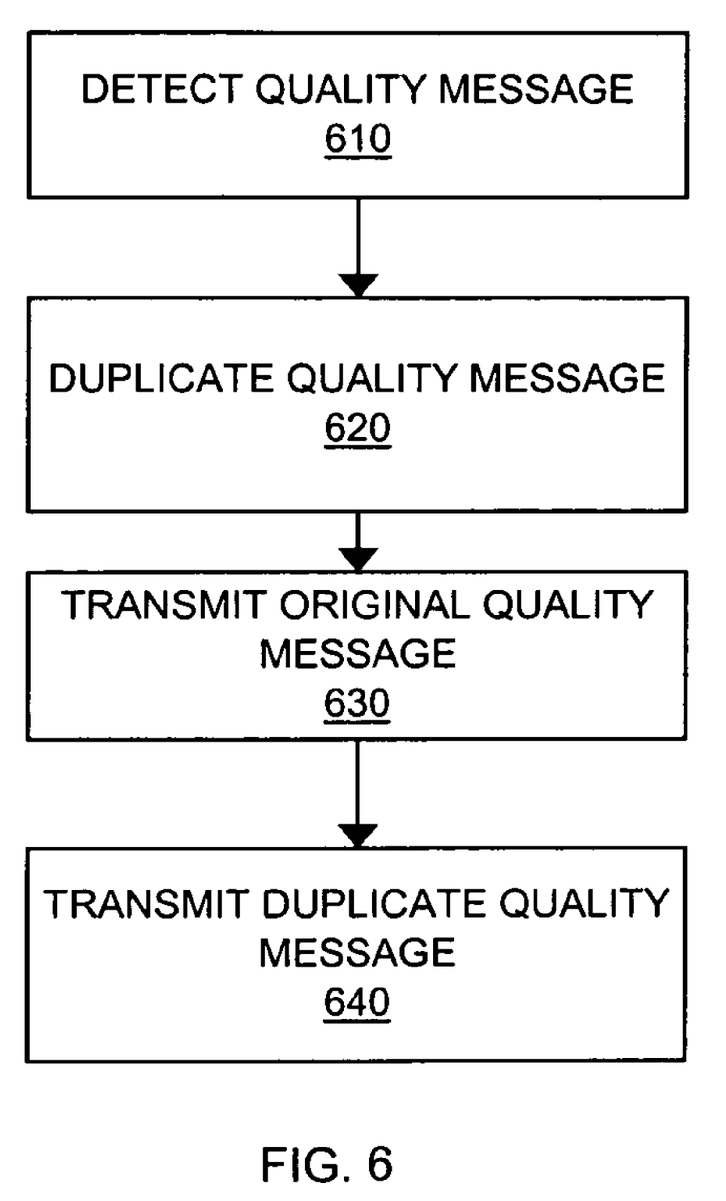
FIG. 6 illustrates the operation of a message processing system in an embodiment of the invention.

FIG. 6 illustrates the operation of message processing system 311. Message processing system 311 could receive or detect a regional quality message or a session quality message from either an end device or an access point, or both (Step 610). Upon detecting either a regional or session quality message (Step 610), message processing system 311 duplicates the quality message (Step 620). The original quality message is transmitted to its original destination (Step 630). The duplicate quality message is transmitted to the appropriate quality processing system (Step 640). In this case, the service provider is service network 330, and the QPS is QPS 331.

Figure 7:
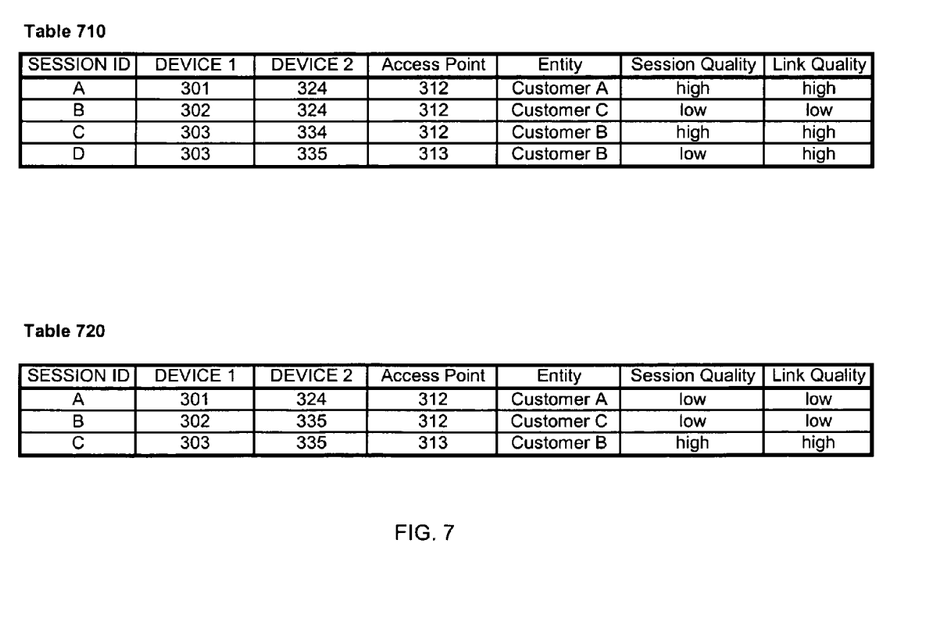
FIG. 7 illustrates quality correlation tables in an embodiment of the invention.

FIG. 7 illustrates table 710 in an embodiment of the invention. Table 710 stores the identity of a session and the corresponding devices and access points associated with the session. Table 710 also stores the corresponding session quality data and regional quality data. The devices could be identifies in various manners, such as by aliases, device IDs, and user IDs, as well as by other means.

In this example, session A identifies a voice over packet session between end device 301 and end device 324. Session B identifies the video over packet session between device 302 and end device 324. Session C identifies a voice over packet session between device 303 and device 334. Session D identifies a voice over packet session between device 303 and 335. The sessions could be overlapping sessions between devices. The sessions could also be multi-party sessions, such as a three-way call.

In operation, devices 301, 302, and 303 can transmit session quality messages indicating quality metrics related to the end-to-end characteristics of their respective sessions. In addition, regional quality messages indicating quality metrics related to the wireless characteristics of the respective session can be sent by end devices and access points. QPS 321 or QPS 331 receives the regional and session quality messages and stores them in association with a determined entity.

The data stored in table 710 can be used by network operators or management to more effectively correlate network operations. A cross-correlation between multiple sessions could be performed to determine the cause of low quality for one session by investigating the wireless link performance for another, related session.

For example, correlating session A to session B shows that the overall session quality for session A was high, while the session quality for B was low. The high session quality for A implies that service provider network 330 was functioning properly. Thus, the cause of low session B quality was likely the performance of an element within access provider network 310. Further examination shows that the wireless link quality for session B was low, pointing to the performance of access point 312 as the cause of low session B quality. However, the wireless link quality for session A was high. Thus, access point 312 likely was operating correctly, leaving the wireless operations of end device 302 as the cause of the low wireless link quality, and therefore the low session B quality.

In response to determining that end device 302 was the cause of the low session quality, the entity associated with end device 302, customer C, can be notified of the cause. This advantageously removes the burden of trouble shooting the performance of access provider network 310 and service provider network 330. Furthermore, this advantageously notifies customers as to the reasons behind poor session performance, thereby maintaining reputations for quality associated with access and service providers.

In another example of cross-correlation capabilities, the session quality for session C is high, whereas the session quality for session D is low. However, both sessions involve end device 303 and access point 313. In addition, the wireless link quality for both sessions C and D is rated as high. To determine the cause of the low session D quality, it can be surmised that end device 303 and access point 313 are operating effectively. It can also be surmised that service provider network 330 is operating correctly as the session quality between device 303 and device 334 is high. Therefore, the cause of the low session D quality likely rests with end device 335.

In response to determining that end device 335 is the likely cause of low session D quality, the entity associated with end device 303, customer B, can be notified that access provider network 310 was operating as prescribed. Furthermore, the operator of service provider network 330 can take action to improve the performance of end device 335. Advantageously, valuable resources are not wasted by troubleshooting the operations of access provider network 310 and service provider network 330 when the likely cause of low session D quality was end device 335.

FIG. 7 also illustrates Table 720 in an embodiment of the invention. Table 720 illustrates another example of cross-correlation capabilities. In Table 720, session A includes end device 301, end device 324, and access point 312. Session B includes end device 302, end device 335, and access point 312. Session C includes end device 303, end device 335, and access point 313.

In this example, an entity associated with session B complains that that the service quality was low. To determine the cause of the low session quality, information in Table 7 can be processed to determine a correlation between the quality of other related sessions. In this case, sessions B and C are related by the inclusion of end device 335. However, whereas session B quality was low, session C quality was high. It can be concluded that service provider network 330 was operating correctly from the fact that the quality of session C was high. Thus, the cause of low session B quality likely resides in access provider network 310.

To determine the cause within access provider network 310, other related sessions are examined for correlations. First, it can be determined that message processing system 311 and routing system 314 are operating in an adequate fashion as session C was rated high. Next, sessions A and B can be compared as they are related by access point 312. In both cases, the wireless link quality was rated low. Thus, access point 312 was likely operating inadequately. The operator of access provider network 310 can take action to test and correct the operation of access point 312 first. If such action does not improve session quality, end device 301 and 302 can be inspected for faulty operation.

In another example, Table 710 also holds data describing entities associated with the various sessions, devices, and access points. In this illustration, the entities described are customers. A customer could request from a service provider that a report be produced with respect to the quality of wireless services provided to its end users. In this case, customer A is related to session A, which had a high quality wireless link. Customer C is related to session B which had a low quality wireless link. Depending upon further details, such as whether the wireless signals transmitted from the devices were low, or whether the wireless signals transmitted from the access points were low, a solution to the low quality of service provided customer C could be provided. For example, if it is determined that the end devices transmit low quality signals, customer C could replace or upgrade the wireless end devices used by its users. Alternatively, customer C could instruct its users to operate their end devices closer to an access point.

Advantageously, communication network 300 provides a means of creating a record of key performance criteria for wireless data sessions as a means of monitoring network quality. The quality criteria data can be provided to a service provider's network for storage, processing and evaluation of the data. This data will ensure an ongoing view of the end-to-end network performance to include the performance of the wireless link. It is applicable primarily to packet based networks accessed through wireless media.

Computer System

Figure 8:
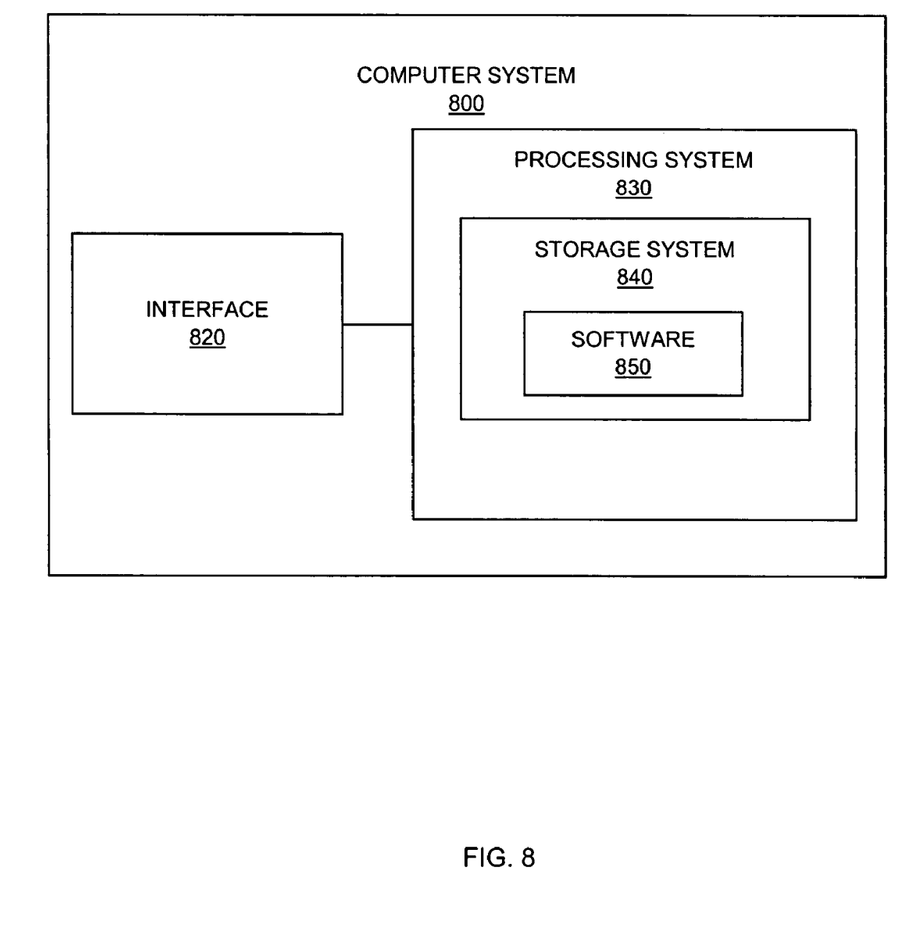
FIG. 8 illustrates a computer system in an embodiment of the invention.

FIG. 8 illustrates computer system 800 in an embodiment of the invention. Computer system 800 includes interface 820, processing system 830, storage system 840, and software 850. Storage system 840 stores software 850. Processing system 830 is linked to interface 820. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 820-850.

Interface 820 could comprise a network interface card, modem, port, or some other communication device. Signaling interface 820 may be distributed among multiple communication devices. Interface 830 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for quality processing systems 120, 321, and 331.

What is claimed is:

1. A quality processing system for isolating a session problem for a session in a first region and a second region of a plurality of regions of a communication network, the quality processing system comprising:
   an interface configured to receive a first quality message from a wireless end device in the first region wherein the first quality message indicates a first quality metric of the first region during the session, wherein the first quality metric of the first region comprises a rating of a wireless link between the wireless end device and a wireless access point coupling the first region and the second region, and receive a session quality message indicating a session quality metric for the session; and
   a processing system configured to process the first quality metric with the session quality metric to determine if the session problem occurred in the first region or the second region, generate an isolation message indicating in which of the first region or second region the problem occurred, and transfer the isolation message.

2. The quality processing system of claim 1 wherein the problem is determined to have occurred in the second region if the session quality metric is of a lower level than the first quality metric.

3. The quality processing system of claim 1 wherein the session quality metric indicates a rating of the overall quality of the session between the wireless end device in the first region and a destination in the second region.

4. The quality processing system of claim 1 wherein the rating of the wireless link comprises a rating of the signal strength of the wireless link.

5. The quality processing system of claim 1 wherein the rating of the wireless link comprises a rating of the data rate of the wireless link.

6. The quality processing system of claim 1 wherein the wireless access point comprises a WiFi access point.

7. The quality processing system of claim 1 wherein the wireless access point comprises a WiMax access point.

8. The quality processing system of claim 1 wherein the session comprises a voice over packet session.

9. The quality processing system of claim 1 wherein the session comprises a video over packet session.

10. A method of operating a quality processing system for isolating a session problem for a session in a first region and a second region of a plurality of regions of a communication network, the method comprising:

in the quality processing system, receiving a first quality message indicating a first quality metric of the first region during the session, wherein the first quality metric of the first region comprises a rating of a wireless link between the wireless end device and a wireless access point coupling the first region and the second region;

in the quality processing system, receiving a session quality message indicating a session quality metric for the session;

in the quality processing system, processing the first quality metric with the session quality metric to determine if the session problem occurred in the first region or the second region;

in the quality processing system, generating an isolation message indicating in which of the first region or the second region the problem occurred; and in the quality processing system, transferring the isolation message.

11. The quality processing system of claim 10 wherein the problem is determined to have occurred in the second region if the session quality metric is of a lower level than the first quality metric.

12. The method of claim 10 wherein the session quality metric indicates a rating of the overall quality of the session between the wireless end device in the first region and a destination in the second region.

13. The method of claim 10 wherein the rating of the wireless link comprises a rating of the signal strength of the wireless link.

14. The method of claim 10 wherein the rating of the wireless link comprises a rating of the data rate of the wireless link.

15. The method of claim 10 wherein the wireless access point comprises a WiFi access point.

16. The method of claim 10 wherein the wireless access point comprises a WiMax access point.

17. The method of claim 10 wherein the session comprises a voice over packet session.

18. The method of claim 10 wherein the session comprises a video over packet session.

19. A software product for isolating a session problem for a session in a first region and a second region of a plurality of regions of a communication network, the software product comprising:

software operational when executed by a computer system to direct the computer system to receive a first quality message indicating a first quality metric of the first region during the session, wherein the first quality metric of the first region comprises a rating of a wireless link between the wireless end device and a wireless access point coupling the first region and the second region, receive a session quality message indicating a session quality metric for the session, process the first quality metric with the session quality metric to determine if the session problem occurred in the first region or the second region, generate an isolation message indicating in which of the first region or second region the problem occurred, and transfer the isolation message; and a storage medium configured to store the software.

* * * * *